(12) United States Patent
Kovalchuk et al.

(10) Patent No.: US 10,961,427 B2
(45) Date of Patent: Mar. 30, 2021

(54) COMPLETION TOOLS WITH FLUID DIFFUSION CONTROL LAYER

(71) Applicants: Anton Kovalchuk, Houston, TX (US); Anil Sadana, Houston, TX (US)

(72) Inventors: Anton Kovalchuk, Houston, TX (US); Anil Sadana, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 468 days.

(21) Appl. No.: 15/712,203

(22) Filed: Sep. 22, 2017

(65) Prior Publication Data

US 2019/0092998 A1    Mar. 28, 2019

(51) Int. Cl.

| C09K 8/44 | (2006.01) |
|---|---|
| C04B 24/28 | (2006.01) |
| C04B 18/24 | (2006.01) |
| E21B 33/127 | (2006.01) |
| E21B 33/12 | (2006.01) |
| E21B 43/08 | (2006.01) |
| C04B 26/04 | (2006.01) |

(52) U.S. Cl.
CPC .............. *C09K 8/44* (2013.01); *C04B 18/24* (2013.01); *C04B 24/281* (2013.01); *C04B 26/045* (2013.01); *E21B 33/127* (2013.01); *E21B 33/1208* (2013.01); *E21B 43/084* (2013.01)

(58) Field of Classification Search
CPC ...................................................... E21B 33/00
See application file for complete search history.

(56) References Cited

U.S. PATENT DOCUMENTS

| 2,661,064 A * | 12/1953 | Rockoff | E21B 33/128 |
| | | | 277/338 |
| 5,284,700 A * | 2/1994 | Strauss | B32B 5/26 |
| | | | 442/141 |
| 6,245,841 B1 | 6/2001 | Yeager et al. | |
| 6,632,527 B1 * | 10/2003 | McDaniel | B01J 2/20 |
| | | | 428/402 |
| 7,427,654 B1 | 9/2008 | Cheng et al. | |
| 9,303,200 B2 | 4/2016 | Korte et al. | |
| 2006/0131031 A1 | 6/2006 | McKeachnie et al. | |
| 2008/0261014 A1 * | 10/2008 | McGuire | B29C 51/28 |
| | | | 428/297.1 |
| 2009/0200013 A1 * | 8/2009 | Craster | E21B 41/02 |
| | | | 166/242.4 |
| 2009/0236091 A1 * | 9/2009 | Hammami | B29C 53/8016 |
| | | | 166/242.1 |
| 2009/0277625 A1 | 11/2009 | Bai et al. | |

(Continued)

FOREIGN PATENT DOCUMENTS

EP    0396383 A2    11/1990

OTHER PUBLICATIONS

Colquhoun et al. "Mechanical behaviour of degradable phosphate glass fibres and composites—a review", Biomed. Mater. 11 (2016) 18 pages.

*Primary Examiner* — William D Hutton, Jr.
*Assistant Examiner* — Avi T Skaist
(74) *Attorney, Agent, or Firm* — Cantor Colburn LLP

(57) ABSTRACT

A completion tool comprises a mandrel; a swellable element disposed about the mandrel; and a protective layer disposed on a surface of the swellable element and configured to inhibit diffusion of a downhole fluid to the swellable element; the protective layer comprising a degradable textile-based composite.

17 Claims, 3 Drawing Sheets

(56) References Cited

U.S. PATENT DOCUMENTS

| | | |
|---|---|---|
| 2010/0326660 A1 | 12/2010 | Ballard et al. |
| 2011/0308802 A1 | 12/2011 | Ladva et al. |
| 2014/0102726 A1* | 4/2014 | Gamstedt ................ B05D 7/50 166/387 |
| 2014/0262212 A1 | 9/2014 | Sherlin |
| 2014/0295723 A1 | 10/2014 | Nelson et al. |
| 2015/0337619 A1 | 11/2015 | Hern et al. |
| 2016/0001532 A1* | 1/2016 | Maziers ................ B32B 27/281 428/318.6 |
| 2016/0145486 A1 | 5/2016 | Weaver et al. |
| 2016/0281454 A1 | 9/2016 | Zhu et al. |
| 2018/0131124 A1 | 5/2018 | Matlack et al. |
| 2020/0318456 A1 | 10/2020 | Kovalchuk et al. |

\* cited by examiner

COMPLETION TOOLS WITH FLUID DIFFUSION CONTROL LAYER

BACKGROUND

Isolation of downhole environments depends on the deployment of a downhole tool that effectively seals the entirety of the borehole or a portion thereof, for example, an annulus between a casing wall and production tube. Swellable packers are particularly useful in that they are capable of generating a contact force against a nearby structure when exposed to one or more downhole fluids such as water, oil, or a combination thereof. Compared with mechanically setup packers and inflatable packers, fluid-swellable packers are easier to set up.

Oil swellable packers normally contain an elastomer such as ethylene propylene diene monomer (EPDM) that expands when exposed to hydrocarbon based fluids. EPDM rubber often swells rapidly in the oil or oil based fluids and can seal a borehole within one or two days at elevated temperatures. However, under certain circumstances, it is desirable to delay the swelling of the packers to allow the operator to have more time to carry out various completion operations. Such delayed swelling period can be a few days or weeks. Thus, alternative sealing elements having controlled swelling rate are desired in the art.

BRIEF DESCRIPTION

A completion tool for a flow channel is disclosed. The completion tool comprises a mandrel; a swellable element disposed about the mandrel; and a protective layer disposed on a surface of the swellable element and configured to inhibit diffusion of a downhole fluid to the swellable element; the protective layer comprising a degradable textile-based composite.

A method of sealing using the completion tool is also disclosed. The method comprises disposing the completion tool in a wellbore; degrading the protective layer; and allowing the swellable element to swell upon contact with a downhole fluid permeated through the protective layer.

A method of manufacturing a packer comprises disposing a textile substrate and a precursor of a polymeric binder on a surface of a swellable element, and curing the precursor.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
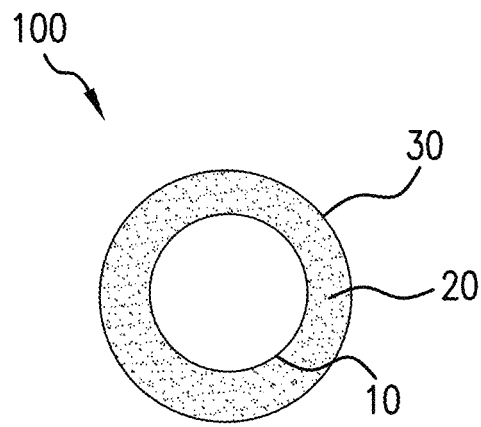
FIG. 1 is a cross-sectional view of an exemplary completion tool having a mandrel that bears a swellable element and a protective layer disposed on a surface of the swellable element.

The inventors hereof have discovered that a protective layer can be formed on a surface of a swellable element to delay and control the swelling rate of the swellable element. As shown in FIG. 1, a completion tool 100 includes a mandrel 10, a swellable element 20 disposed about the mandrel 10, and a protective layer 30 disposed on a surface of the swellable element 20 and configured to inhibit diffusion of a downhole fluid to the swellable element 20.

The protective layer comprises a degradable textile-based composite. Advantageously, the protective layer encapsulates the swellable element and prevents the swellable element from direct contact with a downhole fluid. Because the swellable element is not in direct contact with downhole fluids, its swelling can be effectively delayed.

The degradable textile-based composite comprises a polymeric binder and a textile substrate. The textile substrate can be used as a reinforcement providing initial strength and structural integrity to the protective layer. The textile substrate, together with the polymeric binder, can also degrade and lose original strength after deployment in an oilwell. Thus eventually the textile substrate and the polymeric binder do not constrain swelling of the swellable element.

By tuning the formulation of the degradable textile-based composite as well as the thickness of the protective layer, the degradation time of the protective layer can be tuned. By adjusting the degradation rate of the protective layer, the swelling rate of the swellable element can be controlled.

The protective layer can be in the form of a layer having an average thickness of about 0.1 mm to about 15 mm, specifically about 1.5 mm to about 15 mm, more specifically about 1.5 mm to about 7 mm. The protective layer can be chemically and/or physically bonded to the swellable element, preferably chemically bonded to the swellable element. Chemically bonding the protective layer to the swellable element includes reacting one or more component of the protective layer with the swellable element, and/or reacting one or more component of the protective layer with a primer disposed on a surface of the swellable element. In an embodiment, the protective layer and the swellable element are seamlessly bonded together forming a single piece during a cure procedure. The protective layer does not have any apertures.

The polymeric binder comprises one or more of the following: an epoxy; a cured cyanate ester; a bismaleimide resin; or a polyimide. As used herein, an epoxy refers to a polymer derived from an epoxy base and a curing agent. The epoxy base includes a glycidyl ether epoxy resin, glycidyl ester epoxy resin, glycidyl amine epoxy resin, trifunctional epoxy resin, tetrafunctional epoxy resin, novolac epoxy resin, cresol-novolac epoxy resin, aliphatic epoxy resin, alicyclic epoxy resin, or nitrogen containing epoxy resin. Bisphenol A epoxy resins, bisphenol F epoxy resins, novolac epoxy resins, and aliphatic epoxy resins are specifically mentioned.

Glycidyl ether epoxy resin can be derived from glycidyl ether monomers of the formula:

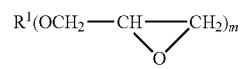

where $R^1$ is an alkyl or aryl, and m is an integer of 1 to 6, 1 to 4, or 2 to 3. Glycidyl ethers of polyhydric phenols can be obtained by reacting a polyhydric phenol with an excess of chlorohydrin such as epichlorohydrin. In an embodiment, the epoxy base is bisphenol A diglycidyl ether, for example, EPON 828, commercially available from Momentive Performance Materials Inc.

Curing of epoxy resin may be achieved by crosslinking with polyfunctional curatives (hardeners) or reacting an epoxy with itself (homopolymerisation). In principle, any molecule containing a reactive hydrogen may react with the epoxide groups of the epoxy resin. Common classes of hardeners for epoxy resins include amines, acids, acid anhydrides, phenols, alcohols, and thiols. In an embodiment, the hardener is a polyfunctional primary amine such as a polyetheramine JD-FAMINE D-230 available from HUNTSMAN.

When an epoxy is used, the polymeric binder can further comprise an epoxidized natural oil. Exemplary epoxidized natural oils include epoxidized soybean oils, epoxidized linseed, epoxidized palm oil, epoxidized cottonseed oils, epoxidized algae oils, and the like. In an embodiment, the epoxidized natural oils are biodegradable. Epoxidized oils are commonly obtained by the reaction of peroxidies such as hydrogen peroxide and peracetic acid with unsaturated oils. The weight ratio of the epoxidized natural oil relative to the epoxy binder is about 1:100 to 1:50, about 1:35 to 1:20, or about 1:10 to 1:5.

Cyanate esters are compounds generally based on a phenol or a novolac derivative, in which the hydrogen atom of the phenolic OH group is substituted by a cyanide group (—OCN). Suitable cyanate esters include those described in U.S. Pat. No. 6,245,841 and EP 0396383. In an embodiment, cyanate esters are based on resorcinol, p,p'-dihydroxydiphenyl, o,p'-dihydroxydiphenyl methane, 2,2-bis(4-hydroxyphenyl)propane (bisphenol A), tetramethylbisphenol F, hexafluorobisphenol A, bisphenol E, bisphenol M, dicyclopentadienyl bisphenol, o,p'-dihydroxydiphenyl methane, p,p'-dihydroxydiphenyl propane, p,p'-dihydroxydiphenyl sulfone, p,p'-dihydroxydiphenyl sulfide, p,p'-dihydroxydiphenyl oxide, 4,4'-methylenebis(2,6-dimethyl phenol), p,p', p"-tri-hydroxy triphenyl ethane, dihydroxynaphthalene and novolac resins which contain more than 2 phenol moieties per moleculeor, or a combination thereof.

Cyanate esters can be cured and postcured by heating, either alone, or in the presence of a catalyst. Curing normally occurs via cyclotrimerization (an addition process) of three CN groups to form three-dimensional networks comprising triazine rings. The residual cyanate ester content can be determined quantitatively by methods known in the art, for example, by infrared analysis or by "residual heat of reaction" using a differential scanning calorimeter.

As used herein, a "cured cyanate ester" means that cyanate ester monomers are cured until at least about 70 percent, at least about 80 percent, at least about 85 percent, or at least about 90 percent of the cyanate functional groups are cyclotrimerized. The curing reaction can be conducted at about 150° F. to about 600° F. or about 200° F. to about 500° F. If a catalyst is present, the curing temperature can be lower. Suitable curing catalysts include an active-hydrogen catalyst or transition metal complexes of cobalt, copper, manganese and zinc. Advantageously, cured cyanate esters are controllably degradable in water or brine at elevated temperatures. Without wishing to be bound by theory, it is believed that the cured cyanate ester undergoes hydrolysis reactions when contacted with a downhole fluid eventually producing ammonia and a bisphenol.

Bismaleimide (BMI) resins are derived from monomers, prepolymers, or a combination thereof that carry maleimide terminations. The maleimide end groups can undergo homopolymerization or copolymerization. Exemplary BMI monomers include 4,4'-bismaleimidodiphenylmethane, 2,4-bismaleimidotoluene, 1,3-bismaleimidobenzene, aliphatic BMIs based on alkanes, and the like.

Exemplary degradable polyimides include those derived from a monomer containing at least two anhydride groups, or a derivative thereof, and a monomer containing at least two primary amine groups and at least one acidic group, or a derivative thereof. The monomers containing at least two anhydride groups include, but not limited to, pyromellitic dianhydride (PMDA), 3,3',4,4'-biphenyltetracarboxylic dianhydride (BPDA), 3,3',4,4'-benzophenonetetracarboxylic dianhydride (BTDA), 3,3',4,4'-oxydiphthalic anhydride (ODPA), and 4,4'-hexafluoroisopropylidenebisphthalic anhydride (6FDA). The monomers containing at least two amine groups and at least one acidic group (such as carboxylic acid or sulfinic acid) may be naturally occurring or synthetic amino acids (alpha, beta-diaminopropionic acid, alpha, gamma-diaminobutyric acid, ornithine, lysine, 2,5-diaminoadipic acid, 2,6-diaminopimelic acid, 2,6-diamino-4-hexenoic acid, 2,7-diaminosuberic acid, 2,8-diaminoazelaic acid, cystine, dicarboxidine, arginine, or asparagines) or other synthetic compounds containing at least two amino groups and one acid group, and derivatives/analogues thereof. Exemplary degradable polyimides are described in U.S. Pat. No. 7,427,654.

As used herein, a "textile substrate" refers to a material made from fibers and/or yarns. Fibers/yarns are typically defined as fine thread-like pieces with an aspect ratio of at least about 10:1. The aspect ratio of a fiber/yarn is the ratio of the longer dimension of the fiber/yarn to the shorter dimension. A textile substrate can be in the form of individual fibers such as a continuous filament or a short fiber. A textile substrate can also be in the form of fibrous strands or in the form of a sheet, tape, mat or web, either in a woven or nonwoven form. A woven form can be made by weaving or knitting. A nonwoven form is a random or ordered distribution of fibers made by bonding or entangling fibers by mechanical, thermal, or chemical means or by nonwoven fabric forming techniques such as stitchbonding, air-laying, carding, spun bonding, melt blowing, wet-laying, or other known fabric-forming techniques.

The textile substrate comprises natural fibers, synthetic degradable fibers, recycled fibers, or a combination comprising at least one of the foregoing. Examples of useful natural fibers include wool, linen, silk, cotton, or cellulose. Examples of degradable synthetic fibers include polylactic acid fibers, polyglycolic acid fibers, polyhydroxybutyrate fibers, polycaprolactone fibers, phosphate glass fibers, or a combination comprising at least one of the foregoing.

The relative amounts of the binder and the textile substrate can be adjusted according to the desired properties of the protective layer. In an embodiment, the weight ratio of the binder relative to the textile substrate is about 1:9 to about 9:1 or about 1:4 to about 4:1.

The protective layer can also comprise fillers, pigments, additives, or a combination comprising at least one of the foregoing to accelerate degradation or to slow degradation or to improve mechanical properties or to have a desired color. In an embodiment, the protective layer further contains carbon black, glass fibers, or the like.

The swellable element provides excellent swelling volumes when exposed to oil, water, or a combination comprising at least one of the foregoing. Oil swellable element can contain an elastomer such as ethylene propylene diene monomer (EPDM), styrene butadiene rubber (SBR), synthetic rubbers based on polychloroprene (NEOPRENE™ polymers from DuPont), natural rubbers, polyisoprene, polybutadiene, fluorosilicone rubber (FVMR), butyl rubbers (isobutylene-isoprene rubber IIR), and the like.

Additives such as fillers, activators, antioxidants, processing acids, and curatives can be included in the swellable element. Known additives are described for example in U.S. Pat. No. 9,303,200.

In a specific embodiment, the swellable element comprises ethylene propylene diene monomer, styrene butadiene rubber, or a combination comprising at least one of the foregoing; and the protective layer comprises: a textile substrate comprising a cellulose based fiber in the form of a woven fabric sheet; and a polymeric binder comprising an epoxidized natural oil such as epoxidized soybean oil or epoxidized linseed oil or a combination thereof; and an epoxy derived from bisphenol A diglycidyl ether. The weight ratio of the epoxidized natural oil relative to the epoxy is about 1:100 to 1:50, about 1:35 to 1:20, or about 1:10 to 1:5.

The swellable element having controlled swelling rate such as a packer can be fabricated with any existing composite manufacturing equipment or manually without equipment such as by using hand layup techniques. Several manufacturing technologies can be used for applying a protective layer to the swellable element. Exemplary methods include hand lay-up, wrapping with a prepreg sheet, single filament winding, vacuum-assisted resin transfer molding, compression molding and other methods known to a person skilled in the art.

A method of manufacturing a packer comprises disposing a textile substrate and a precursor of a polymeric binder on a surface of a swellable element, and curing the polymeric binder. If needed, a primer can be applied on the swellable element before the textile substrate and the precursor of the polymeric binder are disposed on the swellable element.

The precursor includes an epoxy base; a cyanate ester; a bismaleimide; or an imide other than bismaleimide. The precursor can include monomers, prepolymers, oligomers, or a combination comprising at least one of the foregoing. Curing agents (also referred to as hardening agent) or crosslinking agent can be added.

In an embodiment, a method of making a swell delayed element comprises soaking a textile substrate in a precursor of a polymeric binder by spreading the precursor with a roller or brush along a surface of the textile substrate or by dipping the textile substrate in a precursor. Prepreg with a textile substrate soaked in a precursor of a polymeric binder can be used for wrapping a swellable element as well. With this technology, standard swellable elements can be converted into delayed swell elements on demand in a field if there is a need for controlling element swell time.

Figure 2:
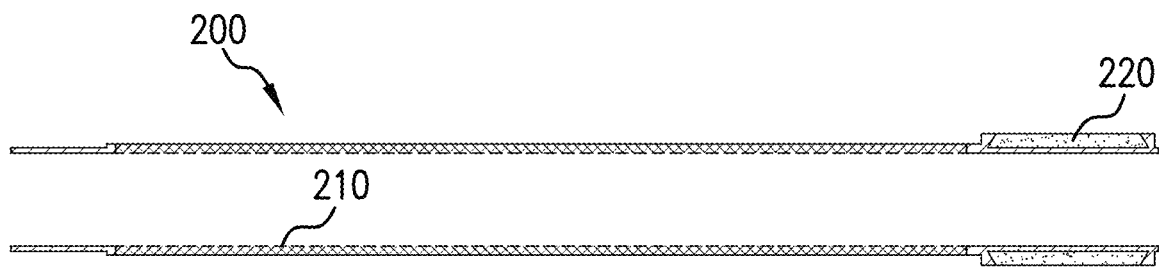
FIG. 2 illustrates a completion tool which contains a sand screen.

The completion tool can be various downhole tools or a component of various downhole tools. In an embodiment, the completion tool is a packer or a sand screen. An exemplary downhole tool is shown in FIG. 2. The tool 200 includes a screen portion 210 and a seal portion 220. The tool can be disposed of a base pipe with end connections to attach to a pipe string and a portion that is perforated or slotted (not shown). The screen portion 210 can include any substrate that are effective to filter the formation solids from produced fluids. Exemplary screen portion includes a slotted liner, a wire wrapped screen, or a mesh. The seal portion 220 can include a swellable element and a protective layer as disclosed herein.

The completion tool can be used to seal a wellbore. The method comprises disposing the completion tool in a wellbore; and allowing the swelling element to swell upon contact with a fluid permeated through the protective layer.

The fluid can comprise a hydrocarbon, water, brine, an acid, a base, or a combination comprising at least one of the foregoing. The brine can include NaCl, KCl, NaBr, MgCl$_2$, CaCl$_2$, CaBr$_2$, ZnBr$_2$, NH$_4$Cl, sodium formate, cesium formate, and the like. The fluid can be a wellbore fluid generated downhole. Alternatively, to further control the swelling profile of the swellable element, a fluid such as an acid can be introduced downhole to accelerate the degradation of the degradable element at the time when sealing is desired. In an embodiment the fluid is a drilling fluid or a completion fluid. In another embodiment, the fluid is an oil-based fluid comprising hydrocarbons.

Depending on the time needed to finish the completion operations, the completion tool can seal a wellbore in less than or equal to about 25 days, in less than or equal to about 20 days, or in less than or equal to about 15 days at a temperature of about 25° C. to about 300° C., about 65° C. to about 250° C., or about 65° C. to about 150° C. or about 175° C. to about 250° C., and a pressure of about 650 kPa to about 100,000 kPa. Advantageously, the completion tool seals a wellbore at least three days, at least five days, or at least one week after the completion tool is deployed downhole. In an embodiment, the polymeric binder, the textile substrate, and swellable element are selected such that a diameter of the swellable element increases less than about 25% after the completion tool is exposed to a downhole fluid for greater than 14 days at about 100° C., based on the initial diameter of the swellable element before the exposure.

Figure 3:
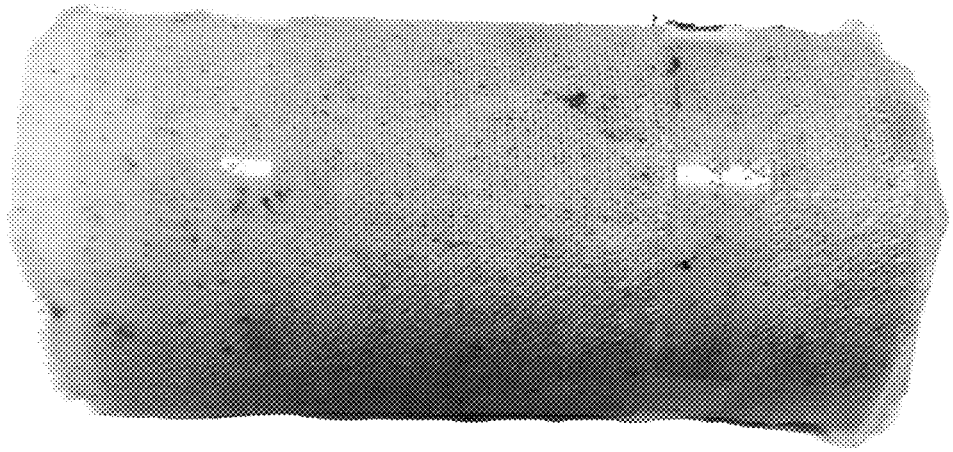
FIG. 3 is a picture of a packer prototype having a swellable core and a protective layer.

FIG. 3 illustrates a packer prototypes having a protective layer as discussed herein. The prototype was made by soaking a cotton fabric with a degradable epoxy composition comprising about 90 wt. % of bisphenol A diglycidyl ether and about 10 wt. % of epoxidized soybean oil. The treated fabric was wrapped around an EPDM packer, and then the epoxy was cured. The packer prototype had a diameter of 2.52 inches.

Figure 4:
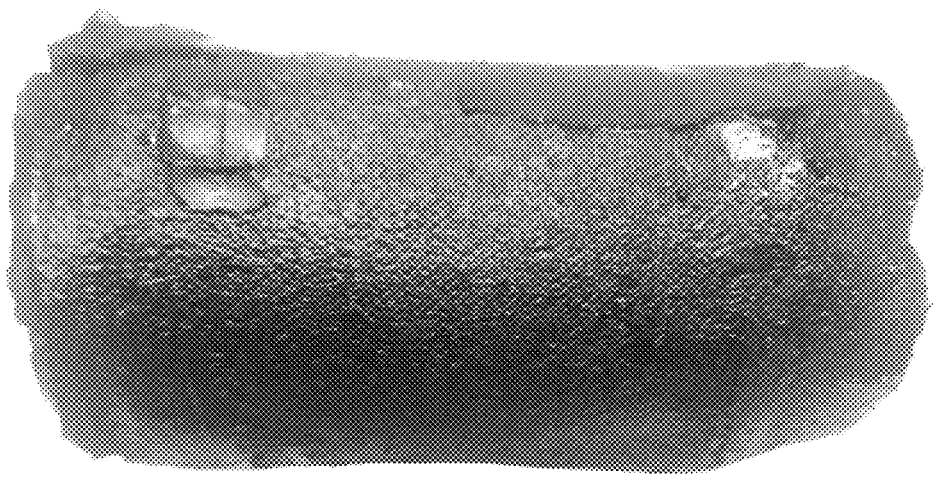
FIG. 4 is a picture of the packer prototype of FIG. 3 after exposing to a drilling mud at 265° F. for two days.
Figure 5:
FIG. 5 is a picture of the packer prototype of FIG. 3 after exposing to a drilling mud at 265° F. for five days.

The prototype was placed insider a pressure cell, which was filled with an oil based drilling mud having about 25% water by weight. The pressure cell was heated to about 265° F. FIG. 4 is a picture of the packer prototype after two days of the test. The diameter of the prototype was increased about 5% to 2.65 inches. FIG. 5 is a picture of the packer prototype after five days of the test. The diameter of the prototype was increased about 13% to 2.85 inches. The results indicate that the protective layer prevents EPDM element from premature swelling in an oil based drilling mud, and significant cracking of the protective layer took place after five days of the test.

Set forth below are various embodiments of the disclosure.

Embodiment 1

A completion tool comprising: a mandrel; a swellable element disposed about the mandrel; and a protective layer disposed on a surface of the swellable element and configured to inhibit diffusion of a downhole fluid to the swellable element; the protective layer comprising a degradable textile-based composite.

Embodiment 2

The completion tool of any prior embodiment, wherein the protective layer has an average thickness of about 1.5 mm to about 15 mm.

Embodiment 3

The completion tool of any prior embodiment, wherein the protective layer is chemically bonded to the swellable element.

Embodiment 4

The completion tool of any prior embodiment, wherein the degradable textile-based composite comprises a polymeric binder and a textile substrate.

Embodiment 5

The completion tool of any prior embodiment, wherein the weight ratio of the polymeric binder relative to the textile substrate is about 1:9 to about 9:1.

Embodiment 6

The completion tool of any prior embodiment, wherein the polymeric binder comprises one or more of the following: an epoxy; a cured cyanate ester; a bismaleimide resin; or a polyimide.

Embodiment 7

The completion tool of any prior embodiment, wherein the polymeric binder comprises an epoxy and an epoxidized natural oil. The epoxidized natural oil can comprise one or more of epoxidized soybean oil or epoxidized linseed oil. The weight ratio of the epoxidized natural oil relative to the epoxy is about 1:100 to 1:50

Embodiment 8

The completion tool of any prior embodiment, wherein the textile substrate is in the form of a continuous filament, a short fiber, a fibrous strand, a sheet, a tape, a mat, a web, or a combination comprising one or more of the foregoing.

Embodiment 9

The completion tool of any prior embodiment, wherein the textile substrate comprises cellulose based fibers.

Embodiment 10

The completion tool of any prior embodiment, wherein the textile substrate comprises synthetic degradable fibers, the synthetic degradable fibers comprising one or more of the following: polylactic acid fibers; polyglycolic acid fibers; polyhydroxybutyrate fibers; polycaprolactone fibers; or phosphate glass fibers.

Embodiment 11

The completion tool of any prior embodiment, wherein the textile substrate comprises recycled fibers.

Embodiment 12

The completion tool of any prior embodiment, wherein the swellable element comprises ethylene propylene diene monomer, styrene butadiene rubber, synthetic rubber based on polychloroprene, fluorosilicone rubber, polyisoprene, polybutadiene, isobutylene-isoprene rubber, natural rubber, or a combination comprising at least one of the foregoing.

Embodiment 13

The completion tool of any prior embodiment, wherein the protective layer further comprises carbon black, glass fibers, or a combination comprising at least one of the foregoing.

Embodiment 14

The completion tool of any prior embodiment, wherein the swellable element comprises ethylene propylene diene monomer, styrene butadiene rubber, or a combination comprising at least one of the foregoing; and the protective layer comprises: a textile substrate comprising a cellulose based fiber in the form of a woven fabric sheet; and a polymeric binder comprising an epoxy and an epoxidized natural oil comprising epoxidized soybean oil or epoxidized linseed oil or a combination thereof.

Embodiment 15

The completion tool of any prior embodiment, wherein the polymeric binder, the textile substrate, and the swellable element are selected such that a diameter of the swellable element increases less than about 25% after the completion tool is exposed to a downhole fluid for greater than 14 days at about 100° C.

Embodiment 16

The completion tool of any prior embodiment, wherein the completion tool is a packer or a sand screen.

Embodiment 17

A method of sealing, the method comprising: disposing a completion tool according to any of prior embodiment in a wellbore.

Embodiment 18

The method of any prior embodiment, wherein the downhole fluid comprises a hydrocarbon, water, brine, an acid, a base, or a combination comprising at least one of the foregoing.

Embodiment 19

The method of any prior embodiment, wherein the downhole fluid is generated downhole.

Embodiment 20

The method of any prior embodiment, wherein the downhole fluid is introduced into a wellbore.

Embodiment 21

The method of any prior embodiment, wherein the downhole fluid is an oil based fluid comprising hydrocarbons.

Embodiment 22

A method of manufacturing a packer, the method comprising disposing a textile substrate and a precursor of a polymeric binder on a surface of a swellable element, and curing the precursor.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A completion tool comprising:
   a mandrel;
   a swellable element disposed about the mandrel; and
   a protective layer disposed on a surface of the swellable element and configured to inhibit diffusion of a downhole fluid to the swellable element; the protective layer comprising a degradable textile-based composite,
   wherein the degradable textile-based composite comprises a polymeric binder and a textile substrate;
   the polymeric binder comprises one or more of the following: an epoxy; a cured cyanate ester; a bismaleimide resin; or a polyimide, and
   the textile substrate comprises phosphate glass fibers,
   wherein the textile substrate is in the form of a continuous filament, a short fiber, a fibrous strand, a sheet, a tape, a mat, a web, or a combination comprising one or more of the foregoing.

2. The completion tool of claim 1, wherein the protective layer has an average thickness of about 1.5 mm to about 15 mm.

3. The completion tool of claim 1, wherein the protective layer is chemically bonded to the swellable element.

4. The completion tool of claim 1, wherein the weight ratio of the polymeric binder relative to the textile substrate is about 1:9 to about 9:1.

5. The completion tool of claim 1, wherein the polymeric binder comprises the epoxy and an epoxidized natural oil.

6. The completion tool of claim 5, wherein the epoxidized natural oil comprises one or more of epoxidized soybean oil or epoxidized linseed oil.

7. The completion tool of claim 5, wherein the weight ratio of the epoxidized natural oil relative to the epoxy is about 1:100 to 1:50.

8. The completion tool of claim 1, wherein the textile substrate further comprises cellulose based fibers.

9. The completion tool of claim 1, wherein the swellable element comprises ethylene propylene diene monomer, styrene butadiene rubber, synthetic rubber based on polychloroprene, fluorosilicone rubber, polyisoprene, polybutadiene, isobutylene-isoprene rubber, natural rubber, or a combination comprising at least one of the foregoing.

10. The completion tool of claim 1, wherein the protective layer further comprises carbon black.

11. The completion tool of claim 1, wherein the polymeric binder, the textile substrate, and the swellable element are selected such that a diameter of the swellable element increases less than about 25% after the completion tool is exposed to a downhole fluid for greater than 14 days at about 100° C.

12. The completion tool of claim 1, wherein the completion tool is a packer or a sand screen.

13. A method of sealing, the method comprising:
    disposing the completion tool of claim 1 in a wellbore;
    degrading the protective layer; and
    allowing the swellable element to swell upon contact with a downhole fluid permeated through the protective layer.

14. The method of claim 13, wherein the downhole fluid comprises a hydrocarbon, water, brine, an acid, a base, or a combination comprising at least one of the foregoing.

15. The method of claim 13, wherein the downhole fluid is generated downhole.

16. The method of claim 13, wherein the downhole fluid is introduced into a wellbore.

17. The method of claim 13, wherein the downhole fluid is an oil based fluid comprising hydrocarbons.

* * * * *